United States Patent [19]

Oda et al.

[11] Patent Number: 4,829,103

[45] Date of Patent: May 9, 1989

[54] UNSATURATED POLYESTER RESIN COMPOSITION HAVING LESS COLORATION AND EXCELLENT TRANSPARENCY

[75] Inventors: Yukio Oda; Mikito Kitayama, both of Yokohama, Japan

[73] Assignee: Showa Denko Kabushiki Kaisha, Tokyo, Japan

[21] Appl. No.: 154,419

[22] Filed: Feb. 10, 1988

[30] Foreign Application Priority Data

Feb. 12, 1987 [JP] Japan ................................. 62-28145

[51] Int. Cl.$^4$ ................................ C08K 3/22
[52] U.S. Cl. .................................. 523/220; 523/171; 523/513
[58] Field of Search ......................... 523/171, 513, 220

[56] References Cited

FOREIGN PATENT DOCUMENTS 52-129722 10/1977 Japan.
55-027306 2/1980 Japan.

Primary Examiner—Lewis T. Jacobs
Attorney, Agent, or Firm—Sughrue, Mion, Zinn, Macpeak, and Seas

[57] ABSTRACT

An unsaturated polyester resin composition suitable for an onyx-like artificial marble is obtained by using aluminum hydroxide having an average primary particle size of at least 20 μm or a mixture thereof with aluminum hydroxide pulverized from the above aluminum hydroxide and having an average particle size of at least 15 μm. This composition has an improved transparency, a reduced coloration, and a good productivity.

8 Claims, 5 Drawing Sheets

UNSATURATED POLYESTER RESIN COMPOSITION HAVING LESS COLORATION AND EXCELLENT TRANSPARENCY

BACKGROUND OF THE INVENTION

1. Field of the Invention

The present invention relates to an unsaturated polyester resin composition for the production of an onyx-like artificial marble, which comprises an unsaturated polyester resin and aluminum hydroxide filled therein.

2. Description of the Related Art

It is known that an artificial marble is prepared by filling at least one member selected from inorganic compounds having a refractive index close to that of an unsaturated polyester resin, such as aluminum hydroxide, alumina white, calcium aluminate and glass powder, into the unsaturated polyester resin.

An especially high transparency can be obtained if aluminum hydroxide is used, because the refractive index of aluminum hydroxide is 1.57 and very close to that of an unsaturated polyester resin, the product is relatively cheap, and the quality is stable. Accordingly, aluminum hydroxide is most widely used for the production of artificial marble products. Proposals have been made to specify the particle size and average particle size for obtaining a resin molded body having an improved transparency. For example, Japanese Unexamined Patent Publication (Kokai) No. 55-27306 teaches that aluminum hydroxide having a particle size in the range of from 0.5 to 200 μm, an average particle size of 8 to 60 μm and a whiteness of at least 92 (as measured by a powder whiteness meter) is filled, and Japanese Unexamined Patent Publication (Kokai) No. 58-189215 teaches that aluminum hydroxide comprising a first group of particles having an average particle size of 10 to 30 μm and a second group of particles having an average particle size of 50 to 90 μm is filled.

Aluminum hydroxide prepared according to the Bayer process generally contains organic impurities unavoidably included from the preparation process, and therefore, if this aluminum hydroxide is filled, the obtained resin molded body is tinted a light yellow color or light reddish brown color. Even if decoloration is performed by using a pigment or the like, a clear color cannot be manifested, and this aluminum hydroxide is not suitable for obtaining products for which a beautiful color is required, such as a washhand stand, a polymer bathtub, a counter and the like.

The above-mentioned problem of coloration can be avoided if the whiteness is improved in aluminum hydroxide by removing organic impurities in the Bayer process by a special means, and this aluminum hydroxide is filled. However, in view of sedimentation in the state of a slurry to be filled in the resin and the strength, surface smoothness and stain resistance of the molded body, aluminum hydroxide having an extremely fine particle size should be used, and in this case, the transparency of the molded body is unavoidably sacrificed. Moreover, even according to the above-mentioned proposals to specify the particle size and average particle size of aluminum hydroxide, the transparency is still insufficient, and development of an unsaturated polyester resin molded body having an improved deep transparency is still desired.

As a means for obtaining a molded body having an excellent transparency, there can be mentioned a method in which a vitreous frit is used as a filler. However, since the vitreous frit contains a strongly alkaline component, the boiling resistance of the molded body is especially poor, and the composition cannot be used for the production of a molded body for which a high water resistance and boiling resistance are required, for example, a bathtub or the like.

Under this background, it is a primary object of the present invention to provide an unsaturated polyester resin having a reduced coloration and an improved deep transparency, and having an excellent water resistance and boiling resistance.

SUMMARY OF THE INVENTION

The present inventors carried out research with a view to attaining the above-mentioned object, and as a result, found that the coloration and deep transparency of a molded body of an unsaturated polyester resin have a close relationship to the size of primary particles of aluminum hydroxide. The present invention was completed based on this finding.

More specifically, in accordance with the first aspect of the present invention, there is provided an unsaturated polyester composition having a reduced coloration and an excellent transparency, which comprises 100 parts by weight of an unsaturated polyester resin and 100 to 300 parts by weight of aluminum hydroxide filled in the unsaturated polyester resin, wherein the aluminum hydroxide has a maximum particle size of up to 200 μm, an average particle size of up to 100 μm, an average particle size of the primary particle thereof of at least 20 μm, and a whiteness as measured by a powder whiteness meter of at least 90.

In accordance with the second aspect of the present invention, there is provided an unsaturated polyester resin composition having a reduced coloration and an excellent transparency, comprising 100 parts by weight of an unsaturated polyester resin and 100 to 300 parts by weight of aluminum hydroxide filled in the unsaturated polyester resin, the aluminum hydroxide consisting of a mixture of (A) 100 to 30% by weight of aluminum hydroxide having a maximum particle size of up to 200 μm, an average particle size of up to 100 μm, an average particle size of the primary particle thereof at least 20 μm, and a whiteness as measured by a photoelectric colorimeter of at least 90; and (B) 0 to 70% by weight of aluminum hydroxide having a maximum particle size of up to 200 μm and an average particle size of 15 to 100 μm, obtained from pulverization of aluminum hydroxide having an average size of the primary particle thereof of at least 20 μm and a whiteness of at least 90; wherein the mixture of the aluminum hydroxides of the above (A) and (B) has a BET specific surface area of at least 1 $m^2/g$.

DESCRIPTION OF THE PREFERRED EMBODIMENTS

The unsaturated polyester resin should have a refractive index of 1.50 to 1.58 when cured, have a viscosity of 10 to 25 poise at 25° C., and be colorless and transparent. As the refractive index of the cured resin composition is close to the refractive index of aluminum hydroxide, that is, 1.57, an excellent transparency is obtained, but in general, a sufficient transparency is obtained if the refractive index of a cured unsaturated polyester resin is in the range of from 1.50 to 1.58. The viscosity at 25° C. of an unsaturated polyester resin is preferably in the range of from 10 to 25 poise. If the viscosity at 25° C. is lower than 10 poise, sedimentation readily occurs, and if the viscosity at 25° C. exceeds 25 poise, the kneading viscosity is drastically increased and kneading or casting of the mixture becomes difficult.

The unsaturated polyester resin used in the present invention includes $\alpha,\beta$-unsaturated dibasic acids or anhydrous acids thereof, such as maleic acid, fumaric acid or their esters; aromatic saturated dibasic acid and anhydrous acids thereof, such as phthalic acid, terephthalic acid or their esters; and resins obtained by dissolving 30–80% by weight of an unsaturated polyester produced by polycondensation of glycols optionally with an aliphatic or cycloaliphatic saturated dibasic acid into 70–20% by weight of an $\alpha,\beta$-unsaturated monomer. The unsaturated polyester resin further includes unsaturated polyester resins terminated with vinyl and vinyl esters obtained by modifying a terminal of the epoxy skeleton with vinyl.

In the first aspect of the present invention, preferably the particle size of aluminum hydroxide is in the range of up to 200 $\mu$m and the average particle size is up to 100 $\mu$m. Coarse particles having a larger size exceeding the above range have a poor compatibility with the resin. Also preferably, the proportion of particles having a particle size larger than 75 $\mu$m is 25 to 75% by weight. If this proportion is lower than 25%, the transparency of the molded body is unsatisfactory, and if this proportion exceeds 75% by weight, the compatibility with the resin is reduced.

Figure 2:
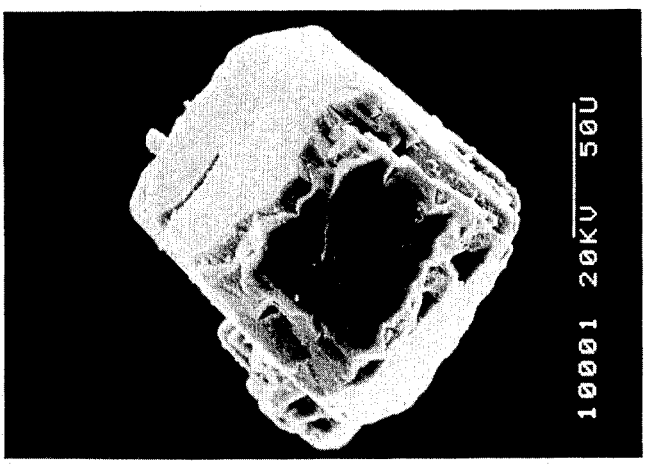
FIGS. 1 and 2 are photographs of aluminum hydroxide particles suitable for the present invention taken by a scanning electron microscope.
Figure 1:
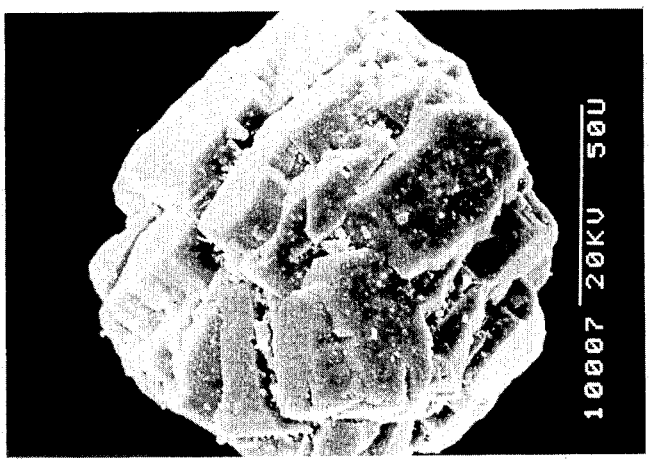
Figure 3:
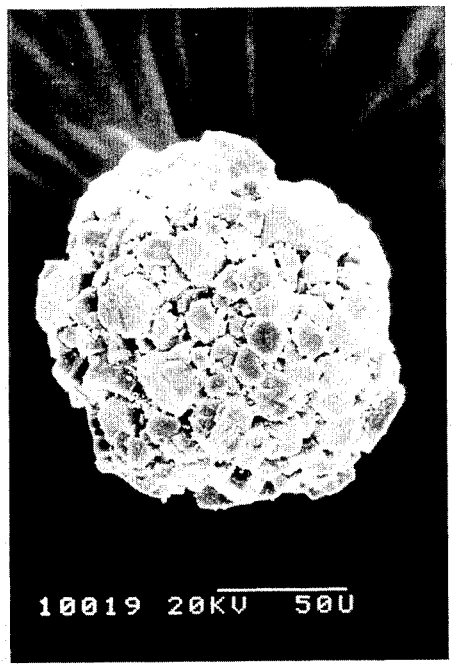
FIG. 3 is a photograph of an aluminum hydroxide particle used in the prior art, taken by a scanning electron microscope.

As the result of research by the present inventors, it was found that the size of the primary particles of aluminum hydroxide has a close relationship to the transparency of a resin molded body. More specifically, if aluminum hydroxide consisting of particles having a reduced agglomeration, i.e., a single crystal form or a crystal form resembling the single crystal form, and having a primary particle average size of at least 20 $\mu$m, as shown in FIGS. 1 and 2 (scanning electron microscope photograph, 500 magnification), is filled, a resin molded body having a deep transparency can be obtained. In contrast, secondary agglomerated particles consisting of primary particles having a size smaller than 20 $\mu$m, as shown in FIG. 3 (scanning electron microscope photograph, 500 magnification), sharply reduce the transparency of the resin molded body.

The whiteness of aluminum hydroxide must be at least 90 as measured by a powder whiteness meter. In this measurement, the whiteness of magnesium oxide is considered to be 100 as the reference standard. If the whiteness is lower than 90, the obtained cured body is tinted a light yellow color or light reddish brown color, and a product having a good hue, which meets the object of the present invention, cannot be obtained.

In the second aspect of the present invention, there is provided a resin composition formed by filling a mixture comprising the above-mentioned aluminum hydroxide (A) and aluminum hydroxide (B) obtained by pulverizing the aluminum hydroxide having an average size of the primary particle thereof of at least 20 $\mu$m and a whiteness of at least 90, at a specific ratio. The second aspect of the present invention is based on the finding that, if this mixture is filled, a product having a deeper transparency than that of the product of the first aspect of the present invention can be obtained and kneading can be made easier. This is considered to be because, by adding the pulverized aluminum hydroxide (B) to the aluminum hydroxide (A), the particle size distribution is made wider, and thus the kneading is made easier, and as a result, air which tends to be entrained in a slurry of only the aluminum hydroxide (A) can be easily removed or inhibited from entrainment. As a means for pulverizing the aluminum hydroxide, there can be mentioned an ordinary rotary ball mill, a vibrating ball mill, a roller mill, a bead mill, and an attritor. Aluminum hydroxide (B) should be one obtained by pulverizing aluminum hydroxide having a large primary particle size (as shown in FIGS. 1 and 2). The intended effect i.e., improvement of transparency, cannot be attained when a product is obtained by pulverizing agglomerated aluminum hydroxide particles having a fine primary particle size (as shown in FIG. 3). Preferably, the average particle size of the pulverized aluminum hydroxide (B) is in the range of from 15 to 100 $\mu$m. If the average particle size is smaller than the lower limit, the resin molded body is yellowed and an improvement of the transparency cannot be expected. If the average particle size exceeds the upper limit, the compatibility with the resin is not improved and sedimentation of the particles occurs in a mold after mixing and molding.

The mixing weight ratio (A)/(B) of the aluminum hydroxide (A) to the aluminum hydroxide (B) is at least 30/70, preferably from 80/20 to 50/50. If this mixing ratio is lower than 30/70 the viscosity of the slurry or the mixture of the resin and aluminum hydroxide is increased, not decreased, and the values L and b are too large to be used in practice. When the mixing ratio is from 30/70 to 80/20, the viscosity of the slurry is decreased and thus that kneading becomes easy, the transparency of a shaped article is excellent, and the surface smoothness and the mechanical strength of a cured composition are improved. When the mixing ratio is from 30/70 to 50/50, the values L and b are small and unfavorable in comparison with 30/70 to 80/20 of the mixing ratio. When the mixing ratio is higher than 80/20, the effect of the reduction of the viscosity of the slurry by addition of the aluminum hydroxide B is lowered.

The BET specific surface area of the mixture of aluminum hydroxide (A) and aluminum hydroxide (B)

must be at most 1 m²/g. If the BET specific surface area exceeds this limit, yellowing of the resin molded body is increased, the productivity is reduced by a prolongation of the curing time, and the sedimentation is increased.

Figure 4:
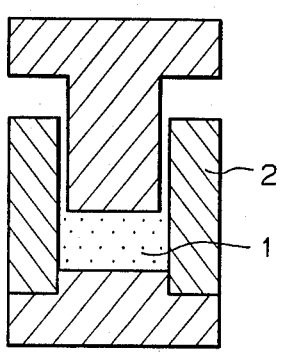
FIG. 4 illustrates the measurement of the average particle size of a primary particle of aluminum hydroxide.

In the average particle size of the primary particles of aluminum hydroxide can be determined by a visual judgement of microscope photographs such as FIGS. 1 to 3 and the measurement of the long and short diameters. Effectively, the average particle size of primary particles can be determined by the compression disintegration method. For example, as shown in FIG. 4, 15 g of aluminum hydroxide 1 is charged in a mold 2 (a cylindrical mold having a diameter of 30 mm and a depth of 50 mm) and compressed under a pressure of 0.75 t/cm² by an oil pressure press for 30 seconds. Then, the aluminum hydroxide is taken out and filled in a resin film bag, any mass is disintegrated by hand, and the average particle size (Blaine method) of the obtained disintegration product is measured by the air permeation method.

The aluminum hydroxide is produced by the so-called layer process, that is, a process in which bauxite is treated with a sodium hydroxide solution to form a supersaturated sodium aluminate solution, to which particulate aluminum hydroxide is added as a seed crystal to hydrolyze the solution. The resultant aluminum hydroxide is also called gibbsite and represented by a chemical formula $\alpha\text{-}Al(OH)_3$. The aluminum hydroxide used for artificial marble is obtained by removing tinting-impurities (mainly organic materials) from the sodium aluminate solution by various methods, followed by hydrolysis. The aluminum hydroxide is usually obtained as a secondary agglomerated particule, comprised of fine primary particles which are agglomerated together, and the size of the primary particles, the degree of the agglomeration and the size of the secondary agglomerated particles depend on the conditions of hydrolysis, i.e., the degree of supersaturation (A/C ratio: sodium aluminate as aluminum oxide/sodium hydroxide ratio), the temperature of the solution, the particle size and amount of the added seed, etc. However, no investigation has been made into the relationship between the color of a shaped article and the constitution of aluminum hydroxide in an artificial marble, and thus aluminum hydroxide having a large whiteness has been used. The present invention has been attained by determining the relationship wherein, by increasing the primary particle size of aluminum hydroxide to at least 20 μm and limiting the specific surface area of aluminum hydroxide within 1 m²/g, the transparency and color of an artificial marble can be remarkably improved. The aluminum hydroxide having a large primary particle size, as shown in FIGS. 1 and 2, can be prepared under the conditions reducing the supersaturated concentration of aluminum hydroxide, i.e., conditions of a low A/C in the cell, a high concentration of seed, and a high temperature in the cell. In contrast, the aluminum hydroxide having a relatively fine primary particle size, as shown in FIG. 3, is prepared under the conditions of increasing the supersaturated concentration of the aluminum hydroxide, i.e., conditions of a high A/C in the cell, a low concentration of seed, a low temperature in the cell.

A molded body of the composition of the present invention is prepared by adding a curing catalyst such as methylethylketone peroxide or benzoyl peroxide to the composition of the present invention, in an amount of 0.5 to 2 parts by weight per 100 parts by weight of the resin, kneading and stirring the mixture, and molding the mixture according to a known method such as room temperature casting, medium or high temperature casting, or if necessary, compression molding. A curing promotor, a low profile additive, and an internal mold release agent can be added, so long as the hue is not degraded thereby.

As pointed out hereinbefore, the cured product obtained by using the comosition of the present invention has a reduced coloration and an excellent transparency, and this can be expressed in Hunter's color coordinates L, a and b. The L value indicates the brightness and a smaller value L denotes a higher transparency. Values a and b are sensible chromatocity indexes, which have positive and negative values and indicate red to green and yellow to blue, respectively. Smaller absolute values of a and b show a reduced coloration.

According to the present invention, when the thickness of the cured product is 15 mm, the value L is smaller than 68 and the absolute values of a and b do not exceed 5. Accordingly, a low viscosity, a high strength, and a high surface smoothness can be obtained.

The so-obtained composition of the present invention is molded according to a known method and is used for the production of bathtubs, toilet stools, washhand stands, and table tops, which have an onyx high-grade appearance. Furthermore, since the coloration is reduced, if a colorant is added, a sharp tint is obtained, and the composition of the present invention is very valuable for the production of a high-quality artificial marble.

The present invention is further described with reference to examples. All parts and percentages hereinafter shown are based on weight unless otherwise specially designated.

EXAMPLE 1

Reagent grade sodium hydroxide (prity of more than 95%) was solved in deionized water to form a 150 g/l solution of sodium hydroxide into this solution, reagent grade aluminum hydroxide having a purity of 60–70% calculated as $Al_2O_3$ was solved under heating to prepare a solution of sodium aluminate with an A/C ratio of 0.8. The solution of organic-free sodium aluminate (C) was added to a precipitation cell containing bayer aluminum hydroxide having a particle size of 2 μm as a seed crystal at a low rate such that the A/C ratio i.e., a ratio of $Al_2O_3$ NaOH of 0.4 was maintained, while keeping the precipitation cell at a temperature of 60° C. and stirring. When the concentration of slurry became 600 g/l, the precipitation was stopped, and the slurry was filtered and then washed with deionized water and dried. The precipitated, washed and dried powder was passed through a Tyler standard sieve having a size of so mesh, or an opening size of 175 μm. The obtained aluminum hydroxide had an average particle size of 70 μm, an average particle size of the primary particle thereof of 25 μm, and a whiteness of 94, as measured by a powder whiteness meter "PWA-2" marketed by KOTAKI SEISAKUSHO K.K.

150 parts of the thus-obtained aluminum hydroxide were mixed with 100 parts of an unsaturated polyester resin ("Polylite TP-123", sold by Dainippon Inki Kagaku Kogyo K.K.; a refractive index of 1.52 as cured, a viscosity of 18 poise at 25° C.) and stirred. The viscosity of this mixture was measured at 35° C. by a BS-type viscometer. Then, 1 part of methylethylketon peroxide ("Permek N", sold by Nippon Oil and Fat K.K.) was added to the mixture to cure the composition. The curing-initiating-time was defined by continuously measuring the viscosity of the composition from the time the curing agent is added, and determining the time period until the time that the viscosity of the composition began to increase due to the curing reaction of the resin. The curing composition was poured into a vinyl
chloride mold having an inner size of 77 mm$\phi \times$ 15 mm$^H$ and cured at a room temperature, followed by heating at 50° C. for 30 minutes to completely cure the molded composition.

The L, a, and b values of the cured composition were measured by a colorimeter (Color Tester "SM-4-CH", sold by Suga Shikenki K.K.).

The results are shown in Table 1.

EXAMPLE 2

In accordance with the same procedures as those of Example 1, aluminum hydroxide was precipitated but precipitation was stopped when the concentration of the slurry finally reached 750 g/l.

The resultant aluminum hydroxide had an average particle size of 85 μm, an average particle size of primary particle of 32 μm, and a whiteness of 93.

A curing composition of the aluminum hydroxide and unsaturated polyester resin was prepared and characteristics of the curing composition and the cured composition were examined in accordance with the same procedures as in Example 1.

The results are shown in Table 1.

EXAMPLE 3 (Comparative)

The sodium aluminate obtained in the same procedures as in Example 1 was added to a precipitation cell at a rate such that the A/C ratio was maintained at 0.6 while keeping the deposition cell at a temperature of 60° C. and stirring. The precipitation was stopped when the concentration of slurry finally reached 200 g/l. The slurry was then filtered, washed, dried and screened, to obtain aluminum hydroxide having an average particle size of 70 μm, an average particle size of the primary particle thereof of 16 μm, and a whiteness of 94.

According to the same procedures as in Example 1, a curing composition of the aluminum hydroxide and unsaturated polyester resin was prepared and the characteristics of the curing composition and the cured composition were examined.

The results are shown in Table 1.

EXAMPLE 4 (Comparative)

A solution of sodium aluminate having a sodium hydroxide concentration of 150 g/l and A/C ratio of 0.8, obtained by a normal Bayer process, was added to a precipitation cell at a slow rate such that the A/C ratio was maintained at 0.45 while keeping the precipitation cell at a temperature of 60° C. and stirring. The precipitation was stopped when the concentration of slurry reached 700 g/l. The slurry was then filtered, washed, dried and screened, to obtain aluminum hydroxide having an average particle size of 100 μm, an average particle size of the primary particle thereof of 26 μm, and a whiteness of 85.

According to the same procedures as in Example 1, a curing composition of the thus-obtained aluminum hydroxide and unsaturated polyester resin was prepared and the characteristics of the curing and cured compositions were examined.

The results are shown in Table 1.

As seen in Table 1, in Examples 1 and 2, i.e., according to the present invention, cured unsaturated polyester resin compositions having an improved transparency and less coloration were obtained. The cured composition of Example 3 had a low transparency and the cured composition of Example 4 was tinted. The curing composition of Example 4 had a high viscosity such that kneading of the curing composition was difficult.

EXAMPLE 5

The respective aluminum hydroxides obtained in Examples 1 and 2, were pulverized in a ball mill. During the pulverization, portions of the pulverized aluminum hydroxide were taken and the average particle size thereof measured, and these portions were used to prepare cured unsaturated polyester resin compositions. The L values (brightness) of the Hunter's color coordinates of the cured compositions were measured.

Figure 5:
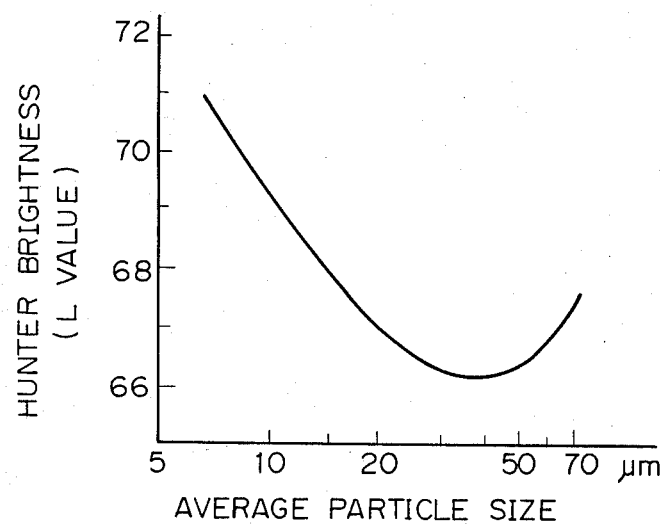
FIG. 5 shows the relationship between the Hunter brightness (L value) of a cured unsaturated polyester resin composition and the average particle size of the pulverized aluminum hydroxide.

FIG. 5 shows the relationship between the average particle size of the pulverized aluminum hydroxide and the L value of the cured unsaturated polyester resin composition. From FIG. 5, it can be seen that the L value is first reduced with a decrease of the average particle size of the pulverized aluminum hydroxide, reaches a minimum value, and then is again increased with a decrease of the average particle size of the pulverized aluminum hydroxide. Namely, there is a range of the average particle size of the pulverized aluminum hydroxide wherein the transparency of the cured composition is equal to or higher than that of the unpulverized aluminum hydroxide. Therefore, it is considered that the addition of the pulverized aluminum hydroxide in that range of the average particle size to the unsaturated aluminum hydroxide does not reduce the transparency of the cured composition, and by an addition of such a pulverized aluminum hydroxide, the characteristics of a cured composition can be improved since the particle distribution can be modified by the addition of pulverized aluminum hydroxide to unpulverized aluminum hydroxide. Generally speaking the pulverization of aluminum hydroxide can be accepted as long as the average particle size of the primary particle thereof of the unpulverized aluminum hydroxide is at least 20 μm and the average particle size of the pulverized aluminum hydroxide is at least 15 μm.

EXAMPLES 6 to 12

An aluminum hydroxide A, obtained in Example 1 or 3, was pulverized in a usual ball mill, to obtain aluminum hydroxide B, having an average particle size and a BET specific surface area as shown in Table 1.

The aluminum hydroxide A, obtained in Example 1 or 3, and the aluminum hydroxide B were mixed in the ratios shown in Table 1. Using these mixtures; curing compositions of an unsaturated polyester resin and aluminum hydroxide were prepared and the characteristics of the curing and cured compositions were examined in the same procedures as in Example 1. In these Examples, the BET specific surface areas of the mixture of aluminum hydroxide were also measured.

The results are shown in Table 1. The Examples 6 to 9 are according to the present invention and Examples 10 to 12 are comparative.

In Table 1, it is seen from a comparison of Examples 6 to 9 with Example 1 that, by an addition of the aluminum hydroxide B to the aluminum hydroxide A of Example 1, the transparency of the cured composition and/or the viscosity of the curing composition were improved or at least made substantially equivalent to those of Example 1, i.e., without the addition.

Example 10 comprised the aluminum hydroxide B having an average particle size of less than 15 μm and a BET specific surface area of more than 1 m²/g, and resulted in a reduced transparency and a tinted color of the cured composition, and a prolonged curing-initiating-time period of the curing composition. Example 11 comprised more than 80% of the aluminum hydroxide B and a BET specific surface area of more than 1 m²/g, and resulted in a tinted coloration of the cured composition and a high viscosity and prolonged curing-initiating-time period of the curing composition. Example 12 comprised a mixture of the aluminum hydroxide A having an average particle size of the primary particle thereof of less than 20 μm and the aluminum hydroxide B, which is prepared by pulverizing the aluminum hydroxide A, at a mixing ratio of 70 to 30, and resited in a reduced transparency.

because the surface of the aluminum hydroxide inhibits polymerization of the resin.

EXAMPLE 15

A similar procedure to that of Example 13 was repeated, but in this Example 15, the mixing ratio of the aluminum hydroxide of A/B was 60/40 (a preferred mixing ratio for reducing the viscosity of the slurry) and the relationship between the viscosity of a curing composition and the average particle size of the pulverized aluminum hydroxide B was determined. The results are shown in FIG. 8.

Figure 8:
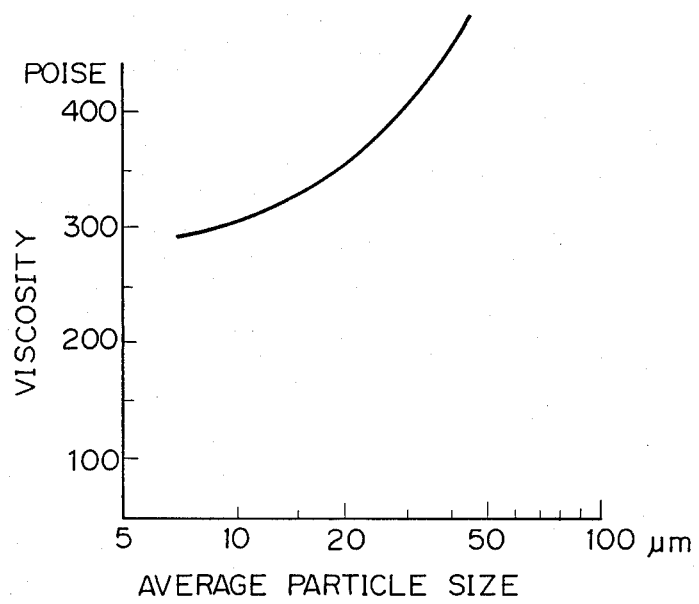
FIG. 8 shows the relationship between the viscosity of a curing composition and the average particle size of the aluminum hydroxide B, when it is filled in a resin as a mixture with the aluminum hydroxide A at a mixing ratio of 4/6.

From FIG. 8, it is seen that the viscosity of the curing composition increases with a reduction of the average particle size of the pulverized aluminum hydroxide. Note, if the specific surface area of the aluminum hydroxide B becomes too small (less than 15 μm), the b value and the curing-initiating-time become unfavorable.

We claim:

TABLE 1

| | Example | | | | | | | | | | |
|---|---|---|---|---|---|---|---|---|---|---|---|
| | 1 | 2 | 3* | 4* | 6 | 7 | 8 | 9 | 10* | 11* | 12* |
| Aluminum hydroxide A: | | | | | | | | | | | |
| average particle size (μm) | 70 | 85 | 70 | 100 | 70 | 70 | 70 | 70 | 70 | 70 | 70 |
| +75 μm (%) | 45 | 65 | 48 | 70 | 45 | 45 | 45 | 45 | 45 | 45 | 48 |
| +45 μm (%) | 85 | 91 | 70 | 90 | 85 | 85 | 85 | 85 | 85 | 85 | 70 |
| average primary particle size (μm) | 25 | 32 | 16 | 26 | 25 | 25 | 25 | 25 | 25 | 25 | 16 |
| whiteness | 94 | 93 | 94 | 85 | 94 | 94 | 94 | 94 | 94 | 94 | 94 |
| Aluminum hydroxide B: | | | | | | | | | | | |
| average particle size (μm) | | | | | 36 | 27 | 16 | 16 | 7 | 16 | 27 |
| BET specific surface area (m²/g) | | | | | 0.8 | 1.2 | 1.6 | 1.6 | 4.4 | 1.6 | 0.9 |
| Mixture of A and B: | | | | | | | | | | | |
| Mixing ratio of A:B | | | | | 6:4 | 6:4 | 6:4 | 4:6 | 6:4 | 2:8 | 7:3 |
| BET specific surface area (m²/g) | | | | | 0.4 | 0.6 | 0.8 | 1.0 | 1.9 | 1.4 | 0.5 |
| Characteristics of curing and cured compositions: | | | | | | | | | | | |
| L value | 67.6 | 63.1 | 75.3 | 64.7 | 66.5 | 66.8 | 67.2 | 67.8 | 70.5 | 69.0 | 74.5 |
| a value | −0.3 | −0.2 | −0.5 | 1.0 | −0.3 | −0.3 | −0.4 | −0.4 | −0.4 | −0.4 | −0.4 |
| b value | 2.4 | 2.7 | 3.2 | 12.7 | 3.7 | 4.2 | 4.6 | 4.9 | 6.0 | 5.6 | 3.9 |
| paste viscosity (poise) | 540 | 730 | 490 | 1030 | 450 | 390 | 340 | 400 | 310 | 890 | 250 |
| curing-initiating-time (min) | 13 | 12 | 14 | 12 | 14 | 18 | 24 | 28 | 53 | 46 | 16 |

(Note)
*Examples 3, 4 and 10 to 12 are comparative.

EXAMPLE 13

Aluminum hydroxides pulverized from the aluminum hydroxide of Example 1 and having various BET specific surface areas were mixed with the aluminum hydroxide of Example 1 at an arbitrary mixing ratio and the mixtures of the aluminum hydroxide were used to prepare a curing composition of an unsaturated polyester resin as in the procedures of Example 1. The b value of the Hunter's color coordinates was measured for the cured compositions as in the procedure of Example 1.

Figure 6:
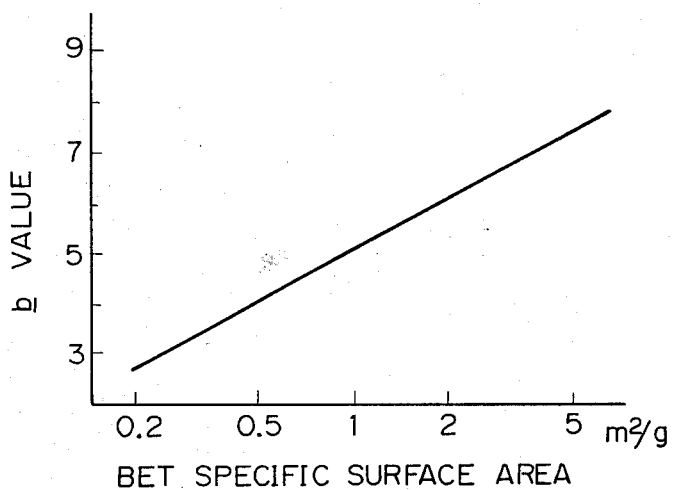
FIG. 6 shows the reationship between the b value of the Hunter color coordinate and the BET specific surface area of the aluminum hydroxide.

The relationship between the b value of the cured composition and the BET specific surface area of the mixture of the aluminum hydroxide is shown in FIG. 6. It is seen that the b value, i.e., yellowing, is increased with an increase of the BET specific surface area.

EXAMPLE 14

The procedure of Example 13 was repeated. In this Example, the relationship between the curing-initiating-time of a curing composition and the BET specific surface area of the mixture of the aluminum hydroxide was examined.

Figure 7:
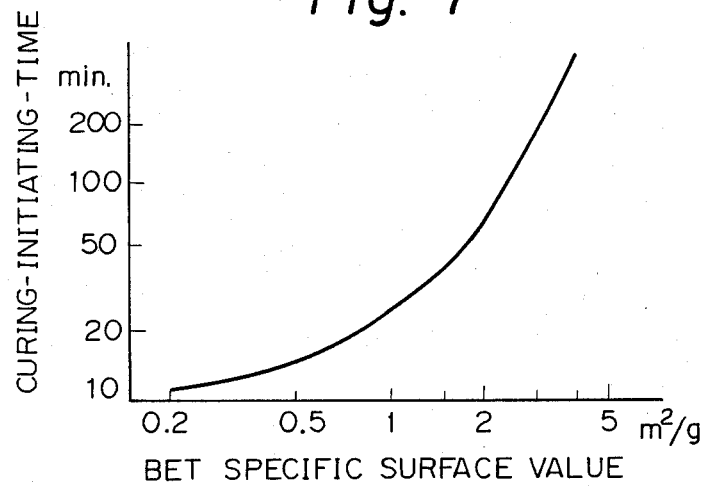
FIG. 7 shows the relationship between the curing-initiating-time of a curing composition and the BET specific surface area of the aluminum hydroxide.

The results are shown in FIG. 7. It is seen that the curing-initiating-time increases with an increase of the BET specific surface area. This is considered to be 1. An unsaturated polyester resin composition having a reduced coloration and excellent transparency, comprising 100 parts by weight of an unsaturated polyester resin and 100–300 parts by weight of aluminum hydroxide filled in the unsaturated polyester resin, said aluminum hydroxide having a maximum particle size of up to 200 μm, an average particle size of up to 100 μm, an average size of a primary particle thereof of at least 20 μm, and a whiteness as measured by a photoelectric colorimeter of at least 90.

2. A composition according to claim 1, wherein the average size of the primary particle of the aluminum hydroxide is at least 25 μm.

3. A composition according to claim 1, wherein the unsaturated polyester resin has a viscosity of 10 to 25 poise at 25° C. and a refractive index of 1.50 to 1.58.

4. A composition according to claim 1, wherein an average particle size of the aluminum hydroxide is at least 50 μm.

5. A composition according to claim 1, wherein 25 to 75% by weight of the aluminum hydroxide has a particle size of larger than 75 μm.

6. An unsaturated polyester resin composition having a reduced coloration and excellent transparency, comprising 100 parts by weight of an unsaturated polyester resin and 100 to 300 parts by weight of aluminum hydroxide filled in the unsaturated polyester resin, said aluminum hydroxide consisting of a mixture of (A) 100 to 30% by weight of aluminum hydroxide having a maximum particle size of up to 200 μm, an average particle size of up to 100 μm, an average size of a primary particle thereof of at least 20 μm, and a whiteness as measured by a photoelectric colorimeter of not less than 90; and (B) 0 to 70% by weight of aluminum hydroxide having a particle size of up to 200 μm and an average particle size of 15 to 100 μm, obtained from pulverization of aluminum hydroxide having an average particle size of a primary particle thereof of at least 20 μm and a whiteness of at least 90;

wherein the mixture of the aluminum hydroxides of the above (A) and (B) has a BET specific surface area of at most 1 m²/g 7. A composition according to claim 6, wherein the average sizes of the primary particles of the aluminum hydroxide of the above (A) and the unpulverized aluminum hydroxide of the above (B) are at least 25 μm.

8. A composition according to claim 6, wherein the mixture of aluminum hydroxide comprises 80 to 50% by weight of the aluminum hydroxide (A) and 20 to 50% by weight of the aluminum hydroxide (B).

* * * * *